United States Patent
Nyuu et al.

(10) Patent No.: US 10,499,675 B2
(45) Date of Patent: *Dec. 10, 2019

(54) STRUCTURE HAVING A LIQUID FILM AND METHOD OF PRODUCING THE SAME

(71) Applicants: TOYO SEIKAN CO., LTD., Tokyo (JP); TOYO SEIKAN GROUP HOLDINGS, LTD., Tokyo (JP)

(72) Inventors: Keisuke Nyuu, Yokohama (JP); Yoshiaki Okada, Yokohama (JP); Tomoyuki Miyazaki, Yokohama (JP); Mikio Asakura, Yokohama (JP); Yosuke Akutsu, Yokohama (JP); Shinya Iwamoto, Yokohama (JP)

(73) Assignees: TOYO SEIKAN CO., LTD., Tokyo (JP); TOYO SEIKAN GROUP HOLDINGS, LTD., Tokyo (JP)

( * ) Notice: Subject to any disclaimer, the term of this patent is extended or adjusted under 35 U.S.C. 154(b) by 119 days.

This patent is subject to a terminal disclaimer.

(21) Appl. No.: 15/552,694

(22) PCT Filed: Feb. 24, 2016

(86) PCT No.: PCT/JP2016/055436
§ 371 (c)(1),
(2) Date: Aug. 22, 2017

(87) PCT Pub. No.: WO2016/170842
PCT Pub. Date: Oct. 27, 2016

(65) Prior Publication Data
US 2018/0027858 A1 Feb. 1, 2018

(30) Foreign Application Priority Data

Apr. 20, 2015 (JP) .................................. 2015-086083

(51) Int. Cl.
*A23L 27/60* (2016.01)
*B65D 1/02* (2006.01)
(Continued)

(52) U.S. Cl.
CPC ............ *A23L 27/60* (2016.08); *B65D 1/0207* (2013.01); *B65D 1/0215* (2013.01); *B65D 23/02* (2013.01);
(Continued)

(58) Field of Classification Search
CPC ..... A23L 27/60; B65D 1/0207; B65D 1/0215; B65D 65/42; B65D 23/02; B65D 65/72; A23V 2002/00
See application file for complete search history.

(56) References Cited

U.S. PATENT DOCUMENTS 3,833,406 A * 9/1974 White .................... B65D 23/02
206/204
6,247,603 B1 6/2001 Farrell et al.
(Continued)

FOREIGN PATENT DOCUMENTS

AL 2014/010534 A1 1/2014
CN 101040016 A 9/2007
(Continued)

OTHER PUBLICATIONS

Communication issued by the State Intellectual Property Office of the P.R.C. dated Sep. 5, 2018 in counterpart application No. 201680023156.9.
(Continued)

*Primary Examiner* — Cephia D Toomer
(74) *Attorney, Agent, or Firm* — Sughrue Mion, PLLC (57) ABSTRACT

A structure (10) includes a formed body (1) of a predetermined shape and a liquid film (3) on the surface thereof, the liquid film (3) being formed by using a dispersion solution obtained by dispersing, in a dispersion medium, a liquid that is incompatible therewith. The structure (10) exhibits slipping property to the emulsified product maintaining stability. Also disclosed is a method for producing the structure.

5 Claims, 2 Drawing Sheets

(51) Int. Cl.
    *B65D 65/42*     (2006.01)
    *B65D 23/02*     (2006.01)
    *B65D 85/72*     (2006.01)

(52) U.S. Cl.
    CPC ............. *B65D 65/42* (2013.01); *B65D 85/72* (2013.01); *A23V 2002/00* (2013.01)

(56) References Cited

U.S. PATENT DOCUMENTS

| | | |
|---|---|---|
| 6,632,493 B1 | 10/2003 | Hildebrand, IV et al. |
| 8,535,779 B1 | 9/2013 | Smith et al. |
| 2006/0100366 A1 | 5/2006 | O'Brien et al. |
| 2011/0297635 A1 | 12/2011 | Maki |
| 2013/0032316 A1 | 2/2013 | Dhiman et al. |
| 2013/0034695 A1 | 2/2013 | Smith et al. |
| 2014/0147627 A1 | 5/2014 | Aizenberg et al. |
| 2014/0187666 A1 | 7/2014 | Aizenberg et al. |
| 2014/0290731 A1 | 10/2014 | Aizenberg et al. |
| 2014/0290732 A1 | 10/2014 | Aizenberg et al. |
| 2015/0108032 A1 | 4/2015 | Akutsu et al. |
| 2016/0075117 A1 | 3/2016 | Akutsu et al. |

FOREIGN PATENT DOCUMENTS

| | | |
|---|---|---|
| CN | 102726480 A | 10/2012 |
| CN | 102925882 A | 2/2013 |
| CN | 103408705 A | 11/2013 |
| JP | 2007-284066 A | 11/2007 |
| JP | 2008-022791 A | 2/2008 |
| JP | 2008-280426 A | 11/2008 |
| JP | 2015-063315 A | 4/2015 |
| WO | 2012/100099 A2 | 7/2012 |
| WO | 2013/022467 A2 | 2/2013 |
| WO | 2014/188883 A1 | 11/2014 |

OTHER PUBLICATIONS

International Search Report of PCT/JP2016/055436 dated May 31, 2016.
Extended European Search Report dated Sep. 12, 2018 from the European Patent Office in counterpart application No. 16782864.9.
Communication dated Aug. 14, 2018, from Korean Intellectual Property Office in counterpart application No. 10-2017-7027465.
Communication dated Aug. 7, 2018 from the Canadian Intellectual Property Office in corresponding application No. 2,978,051.

* cited by examiner

STRUCTURE HAVING A LIQUID FILM AND METHOD OF PRODUCING THE SAME

CROSS REFERENCE TO RELATED APPLICATIONS

This is a National Stage of International Application No. PCT/JP2016/055436 filed Feb. 24, 2016, claiming priority based on Japanese Patent Application No. 2015-086083 filed Apr. 20, 2015, the contents of all of which are incorporated herein by reference in their entirety.

TECHNICAL FIELD

This invention relates to a structure that includes a formed body and a liquid film formed on the surface thereof. The invention, further, relates to a method of producing the structure.

BACKGROUND ART

The containers for containing liquid contents must be capable of discharging the contents irrespective of the materials forming the containers. Discharging the content is not almost of a problem when the liquids having low viscosity such as water and the like are contained. Discharging the content, however, becomes a serious problem when the content is a highly viscous substance such as mayonnaise or ketchup irrespective of the plastic container or the glass container. Namely, the contents of this kind are not quickly discharged despite the container is tilted. Besides, the contents tend to stay on the container wall and cannot be all recovered. Particularly, the content stays in considerable amounts on the bottom of the container and is not all recovered.

In recent years, there have been proposed various kinds of technical arts for improving sliding properties to viscous substances by forming a liquid film on the surfaces of a formed body such as container or the like (e.g., see patent documents 1 and 2).

According to the above technical arts, the sliding property can be strikingly improved as compared to the cases of adding an additive such as lubricant to the synthetic resin that forms the surface of the formed body, and attention has now been paid thereto.

The present applicant has previously proposed a packing container containing an oil-in-water type emulsified product as represented by a mayonnaise-like food, the container forming an oil film on the inner surface thereof with which the oil-in-water type emulsified product comes in contact (JP-A-2015-151131).

With the above means for improving surface properties by forming the oil film on the surface of the base material, however, the life for of effectively exhibiting the slipping property based on the oil film does not last long. Namely, after the passage of a long period of time, the slipping property decreases and depending upon the cases, the content stays on the surface. This tendency becomes conspicuous particularly when the substance that slides on the surface is an emulsified product and, specifically, a mayonnaise-like food containing little oil.

Further, a patent document 3 is proposing a parting oil comprising liquid fat and oil components, animal and plant waxes, and water, and is describing that upon spraying the parting oil onto the container, the dough can be prevented from adhering on the container at the time of baking breads and cakes.

According to experiments conducted by the present inventors, however, when a liquid film is formed by using the above parting oil, the slipping property improves to some extent without, however, much contributing to lengthening the duration for exhibiting slipping property.

PRIOR ART DOCUMENTS

Patent Documents

Patent document 1: WO2012/100099
Patent document 2: WO2013/022467
Patent document 3: JP-A-2008-22791

OUTLINE OF THE INVENTION

Problems that the Invention is to Solve

It is, therefore, an object of the present invention to provide a structure comprising a formed body having a liquid film on the surface thereof, and exhibiting sliding property to viscous substances and, specifically, to emulsified products maintaining stability.

Another object of the present invention is to provide a structure that is used as a container for containing viscous substances and, specifically, emulsified products, the structure exhibiting excellent slipping property to the emulsified products, as well as to provide a method of producing the structure.

Means for Solving the Problems

The present inventors have conducted experiment extensively concerning the slipping property to the emulsified products. As a result, the inventors have discovered that upon forming a liquid film of a dispersion solution comprising an edible oil and water on the surfaces of formed bodies of various shapes, the slipping property to the emulsified products could be improved, the slipping property being exhibited maintaining stability for extended periods of time, and have thus completed the invention.

According to the present invention, there is provided a structure that includes a formed body of a predetermined shape and a liquid film formed on the surface thereof, the liquid film being formed by using a dispersion solution obtained by dispersing, in a dispersion medium, a liquid that is incompatible therewith.

In the structure of the present invention, it is desired that:
(1) The liquid film comprises a first liquid film formed on the surface of the formed body and a second liquid film formed on the first liquid film;
(2) The second liquid film is formed by inverting the phase of the dispersion solution of the first liquid film;
(3) The combination of the dispersion medium and the liquid incompatible therewith is a combination of an edible oil and water or a combination of water and an edible oil;
(4) The formed body is a container;
(5) The container contains an emulsified product as the content; and
(6) The emulsified product is a mayonnaise-like food.

According to the present invention, further, there is provided a method of producing the structure that includes a formed body of a predetermined shape and a liquid film formed on the surface thereof, the method comprising the steps of:

preparing a dispersion solution by dispersing, in a dispersion medium, a liquid that is incompatible therewith; and forming the liquid film of the dispersion solution by applying the dispersion solution onto the surface of the formed body before the dispersion medium and the liquid incompatible therewith separate away into liquid phases.

In the above method of production, it is desired to use a container as the formed body, and to fill the container with the content after the step of forming the liquid film but before the dispersion medium and the liquid incompatible therewith in the liquid film separate away into liquid phases.

EFFECTS OF THE INVENTION

The structure of the present invention not only exhibits excellent slipping property to viscous emulsified products such as mayonnaise-like foods but also sustains the slipping property over extended periods of time.

For instance, according to Example 1 appearing later, structure (directly blow-formed container) has, on the inner surface thereof, a liquid film formed by using a dispersion solution obtained by suspending and dispersing a liquid (water) in a dispersion medium (edible oil) according to the present invention, the liquid being incompatible with the dispersion medium. The structure was filled with the mayonnaise-like food and was stored at normal temperature for one week. The structure, however, was still capable of quickly discharging the content (mayonnaise-like food) in almost all amount (sustained a high initial slipping property). The structure filled with the content and stored at normal temperature for one week was, further, stored at a high temperature for about two months. Even in this case, the structure could discharge the content in almost all amount like the first time (sustained a high slipping property even after the passage of time).

According to Comparative Example 1 forming a liquid film using the edible oil only without water, on the other hand, the initial slipping property was exhibited to some extent. After the passage of the same period of time as above, however, the slipping property decreased greatly, and the content remained in large amounts in the container.

According to Comparative Example 2 in which an emulsion (water-in-oil type emulsified product) of the edible oil and water was prepared by using a surfactant and a liquid film was formed by using the emulsion on the inner surface thereof, further, the initial slipping property and the slipping property after the passage of time were nearly the same as those of when the liquid film was formed by using the edible oil only. Namely, the slipping property deteriorated to a considerable degree after the passage of time as compared to the present invention that formed the liquid film by using a dispersion solution obtained by dispersing water in the edible oil.

According to the present invention as described above, the liquid film is formed by using a dispersion solution obtained by dispersing water in the edible oil, exhibiting excellent slipping property to the emulsified product and sustaining the slipping property. The inventors presume the reasons for this to be as described below.

That is, with the liquid film being formed using the oil component only, such as edible oil or the like, if the emulsified product flows on the liquid film, then the oil component in the liquid film gradually diffuses into the emulsified product on the liquid film and the liquid film gradually extinguishes. Therefore, the slipping property becomes insufficient and, besides, decreases with the passage of time. This also holds true even in the case when the liquid film is formed by using an emulsion (dispersion solution using an emulsifier as represented by a surfactant).

That is, in the liquid film comprising the emulsion, water in the liquid film remains stable due to the surfactant (emulsifier) and is hence stays in the liquid film maintaining stability. It is, therefore, considered that the surface of the liquid film is formed of an oil component. In this case, the emulsified product comes in contact with the oil component among the components forming the liquid film. Namely, the oil component in the emulsion forming the liquid film is taken in by the emulsified product that is flowing on the liquid film and extinguishes. As a result, the slipping property decreases with the passage of time.

In the liquid film according to the present invention, on the other hand, the form of the liquid film changes at least partly from a dispersed state into a liquid phase in which the dispersed components are united. Therefore, if the liquid film is a dispersion solution of water and edible oil, there are formed a dispersion solution (W/O type) of a first liquid film in which the dispersion component (water) is present in a decreased amount on the surface of the formed body due to the passage of time and, on the surface thereof, a second liquid film (O/W type) in which the dispersion solution of the first liquid film is phase-inverted. The first liquid film and the second liquid film are made present between the formed body and the emulsified product not only exhibiting excellent slipping property to the emulsified product that passes on the liquid film but also suppressing the oil component in the liquid film from diffusing into the emulsified product. As a result, it is considered that the liquid film is effectively suppressed from extinguishing and the slipping property is effectively prevented from decreasing with the passage of time.

That is, in the present invention, it is considered that the second liquid film has a function as an agent (lubricating agent) for improving the slipping property to the emulsified product and a function for suppressing the oil component in the liquid film from diffusing into the emulsified product, while the first liquid film has a function for sustaining the second liquid film on the surface thereof and for sustaining the liquid film on the surface of the formed body.

In the liquid film used in the present invention as described above, the dispersion solution partly separates away into a liquid phase to form the second liquid film, and the remainder of the dispersion solution stays unchanged as the liquid film (first liquid film). In this case, the first liquid film on the surface of the formed body still contains the component that forms a matrix of the second liquid film (the dispersion solution is not all separated into the liquid phase), and the interfacial tension decreases between the first liquid film and the second liquid film enabling, presumably, the first liquid film to sustain the second liquid film.

A decrease in the interfacial tension between the liquid films is also considered to contribute to exhibiting the slipping property over extended periods of time maintaining stability without permitting the liquid film to be taken in by the emulsified product despite the emulsified product comes in contact therewith.

Here, so far as the dispersion medium and the liquid dispersed therein are incompatible with each other, the liquid film is not limited to a combination of the edible oil (dispersion medium) and water (liquid incompatible therewith). As the dispersion medium, for instance, there can be used an oily substance other than the edible oil and as the liquid incompatible therewith, there can be used an aqueous substance other than water. It is, further, allowable to use an aqueous liquid as the dispersion medium and an oily liquid as the liquid incompatible therewith.

In the invention, further, the dispersion solution forming the liquid film is a liquid of the non-emulsified type comprising the two components of a dispersion medium and a liquid incompatible therewith. The dispersion solution contains no such emulsifier as surfactant and is, therefore, advantageous from the standpoint of cost, too.

MODES FOR CARRYING OUT THE INVENTION

Figure 1:
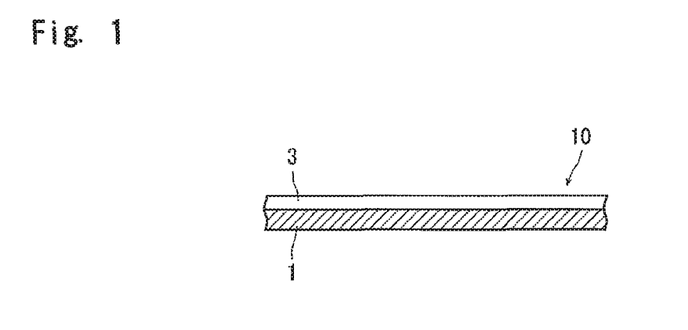
FIG. 1 It is a schematic side sectional view illustrating the surface state of a structure of the present invention.

Referring to FIG. 1, a structure of the present invention generally designated at 10 comprises a formed body 1 formed in a predetermined shape and a liquid film 3 formed on the surface thereof. The liquid film 3 is formed by using a dispersion solution obtained by dispersing, in a dispersion medium (e.g., edible oil), a liquid (e.g., water) that is incompatible therewith.

Figure 2:
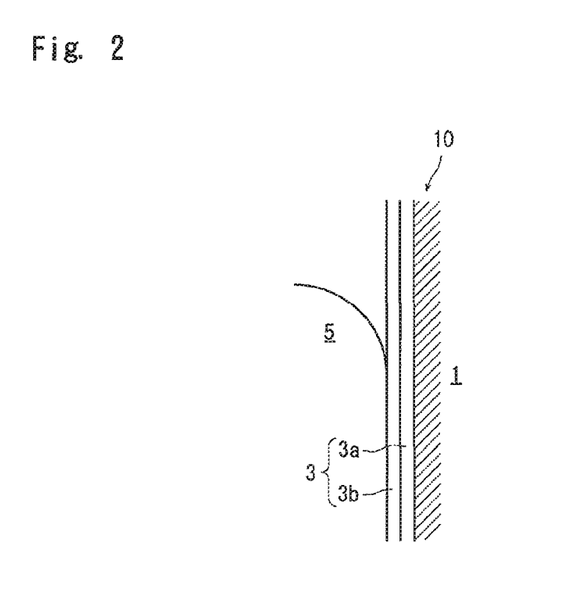
FIG. 2 It is a schematic side sectional view illustrating the state where a viscous substance is in contact with the structure of the present invention.

In the structure 10 as shown in FIG. 2, the liquid film 3 includes a first liquid film 3a and a second liquid film 3b. That is, in a state where a viscous substance (emulsified product) 5 is in contact with the structure 10 of the invention, the second liquid film 3b is included in the liquid film 3 of the dispersion solution on the side of the viscous substance (emulsified product) 5. The liquid forming the second liquid film 3b is a dispersion solution of which the phase is inverted from the dispersion solution forming the first liquid film 3a on the side of the formed body 1, and is incompatible therewith. Besides, the liquid forming the second liquid film 3b does not mix into the viscous substance 5. Specifically, it is desired that water dispersed in the dispersion solution forms a liquid phase to serve as a dispersion medium and in which the edible oil is finely dispersed to form the second liquid film 3b. Here, when sliding on the formed body 1 though dependent upon the properties of the viscous substance 5, it is considered that the viscous substance 5 slides on the interface of the second liquid film 3b or slides in a manner that the second liquid film 3b is separated into the viscous substance 5 and the liquid film 3a, respectively.

There is no specific limitation on the material of the formed body 1 so far as it is capable of holding the liquid film 3 on the surface thereof; i.e., the formed body 1 may be made of any material such as resin, glass or metal and in a shape that meets the use.

From such a standpoint that the formed body 1 exhibits excellent and sustained slipping property to the viscous substances and, specifically, emulsified products, it is desired that the formed body 1 assumes the shape of a pipe for flowing emulsified products, a container for containing the emulsified products or a container lid. It is desired that the liquid film 3 is formed on the surface that comes into contact with the emulsified products. More preferably, the liquid film 3 includes the first liquid film 3a and the second liquid film 3b formed on the surface thereof.

From the standpoint of holding the liquid film 3, furthermore, it is most desired that the surface of the formed body 1 (underlying layer of the liquid film 3) is made of a synthetic resin.

The synthetic resin (hereinafter called underlying resin) may be any thermoplastic resin or thermosetting resin that can be formed. Usually, however, it is desired that the underlying resin is a thermoplastic resin from such a standpoint that it can be easily formed and is capable of stably holding the oil component (edible oil) in the liquid film.

As the thermoplastic resin, there can be exemplified the following resins; i.e., olefin resins such as low-density polyethylene, high-density polyethylene, polypropylene, poly(1-butene), poly (4-methyl-1-pentene) or random or block copolymers of α-olefins such as ethylene, propylene, 1-butene or 4-methyl-1-pentene, and cyclic olefin copolymers;

ethylene-vinyl copolymers such as ethylene-vinyl acetate copolymer, ethylene-vinyl alcohol copolymer and ethylene-vinyl chloride copolymer;

styrene resins such as polystyrene, acrylonitrile-styrene copolymer, ABS and α-methylstyrene-styrene copolymer;

vinyl resins such as polyvinyl chloride, polyvinylidene chloride, vinyl chloride-vinylidene chloride copolymer, poly (methyl acrylate) and poly(methyl methacrylate);

polyamide resins such as nylon 6, nylon 6-6, nylon 6-10, nylon 11 and nylon 12;

polyester resins such as polyethylene terephthalate (PET), polybutylene terephthalate, polyethylene naphthalate and copolymerized polyesters thereof;

polycarbonate resin;

polyphenylene oxide resin; and biodegradable resins such as polylactic acid and the like.

It is allowable, as a matter of course, to also use blends of the above thermoplastic resins as the underlying resin so far as they do not impair the formability.

In the present invention, among the above thermoplastic resins, it is desired to use an olefin resin and a polyester resin that have been used as materials of containers for containing viscous contents, and it is most desired to use the olefin resin.

That is, the olefin resin has a glass transition temperature (Tg) lower than those of the polyester resins such as PET, ensures a higher mobility of molecules at room temperature enabling the edible oil in the components forming the oil film to partly permeate into the interior, and is best suited for stably holding the oil component on the surface.

Further, the olefin resin is highly flexible and has been used for producing squeeze-out containers (squeeze bottles) by the direct-blow forming method. Therefore, the olefin type resin is desirably used even from the standpoint of applying the present invention to such containers.

The formed body 1 may be of a single-layer structure of the thermoplastic resin as described above, or a laminate of the thermoplastic resin with a paper, or may be of a multi-layer structure of a combination of a plurality of thermoplastic resins.

Specifically, when the formed body 1 assumes the form of a container with its inner surface being formed of an olefin type resin or a polyester resin, there can be employed a structure in which an oxygen-barrier layer or an oxygen-absorbing layer is laminated as an intermediate layer via a layer of a suitable adhesive resin and, further, the same resin as the underlying resin (olefin resin or the polyester resin) forming the inner surface is laminated on the outer surface side thereof.

The oxygen-barrier layer in the multi-layer structure is formed by using an oxygen-barrier resin such as ethylene-vinyl alcohol copolymer or polyamide, and can be, further, blended with any other thermoplastic resins in addition to the oxygen-barrier resin so far as they do not impair the oxygen-barrier property.

Further, as described in JP-A-2002-240813, the oxygen-absorbing layer contains an oxidizable polymer and a transition metal catalyst. Due to the action of the transition metal catalyst, the oxidizable polymer is oxidized with oxygen thereby absorbing oxygen and shutting off the permeation of oxygen. The above oxidizable polymer and the transition metal catalyst have been closely described in the above JP-A-2002-240813. Therefore, though not described here in detail, representative examples of the oxidizable polymer include an olefin resin having tertiary carbon atoms (e.g., polypropylene, poly(butene-1), or a copolymer thereof), thermoplastic polyester or an aliphatic polyamide; a polyamide resin containing a xylylene group; and an ethylenically unsaturated group-containing polymer (e.g., polymer derived from a polyene such as butadiene). Further, representative examples of the transition metal catalyst include inorganic salts of transition metals such as iron, cobalt and nickel, and salts or complexes of organic acids.

The adhesive resins used for adhering the layers have been known. As the adhesive resins, for instance, there can be used an olefin resin graft-modified with a carboxylic acid such as maleic acid, itaconic acid, fumaric acid, an anhydride thereof, amide or ester; ethylene-acrylic acid copolymer; an ionically crosslinked olefin copolymer; and ethylene-vinyl acetate copolymer.

The layers may have thicknesses that are suitably determined depending upon the properties required for the layers.

It is, further, allowable to form, as the inner layer, a layer of the reground resin obtained by blending a virgin resin such as olefin resin with a scrap resin such as burr that generates at the time of forming the multi-layer structure. Or it is also allowable to obtain a container of which the inner surface is formed by using the olefin resin or the polyester resin and of which the outer surface is formed by using the polyester resin or the olefin resin.

In the present invention as described earlier, the liquid film 3 on the surface of the formed body 1 is formed by using the dispersion solution obtained by dispersing, in the dispersion medium, the solution that is incompatible therewith.

As the dispersion medium in the dispersion solution that forms the liquid film of the present invention, there can be used a hydrocarbon liquid such as liquid paraffin, as well as fluorine-contained liquid, silicone oil and edible oil. As the liquid that is incompatible with the dispersion medium, there can be used any liquid if it does not mix with the dispersion medium, such as ionic liquid and water. Here, in order that the dispersion solution assumes a suitable degree of dispersion stability, it is desired that the dispersion medium has a viscosity η1 which is larger than a viscosity η2 of the incompatible liquid. As the dispersion medium and the liquid incompatible therewith, further, it is desired to use an edible oil and water in combination or water and an edible oil in combination.

That is, the edible oil is a nonvolatile liquid having a small vapor pressure under the atmospheric pressure and a viscosity which is high to a suitable degree. Therefore, the edible oil does not easily separate away from the surface of the formed body 1 and, specifically, assumes a small angle of contact to the olefin resin, easily spreads on the surface of the olefin resin, and does not at all cause any problem even when it is contacted to or mixed into foods such as a mayonnaise-like food.

As the edible oil, there can be exemplified soy bean oil, rape oil, olive oil, rice oil, corn oil, safflower oil, sesame oil, palm oil, castor oil, avocado oil, coconut oil, almond oil, walnut oil, hazel oil and salad oil. These oils can be also used being mixed together.

Specifically, depending on the surface of the formed body 1 that serves as the underlayer for the liquid film 3, it is desired to use the oil that assumes a small angle of contact, such as not larger than 38 degrees and, preferably, not larger than 25 degrees to the surface at room temperature (25° C.).

Further, an edible oil of a certain kind may easily dissolve (mix) in a substance that passes through on the liquid film 3. In such a case, there may be selected any other edible oil that does not dissolve in the substance that passes through on the liquid film 3. Specifically, the edible oils exemplified above are all incompatible with the mayonnaise-like foods.

The dispersion solution comprising the edible oil and water should contain at least two components. Here, however, if the amount of water is too small, the slipping property to the emulsified product cannot be improved since there is dispersed less water and the effect is not improved for sustaining the slipping property. If the amount of water is too large, on the other hand, it becomes difficult to hold the dispersion solution on the surface of the formed body 1 and the liquid film 3 tends to be formed less easily. Desirably, therefore, the amount of water is in a range of 11 to 900 parts by mass and, specifically, 43 to 400 parts by mass per 100 parts by mass of the edible oil.

In the present invention, the dispersion solution in which the edible oil and water are dispersed can be easily prepared by such a method as forced stirring by using a homogenizer, applying ultrasonic waves to the mixed solution, or forcibly introducing water through an orifice into a pipe in which the edible oil is flowing.

Further, the dispersion solution which is not an emulsified product must be applied onto the surface of the formed body 1 to form the liquid film 3 before the edible oil and water separate away into liquid phases. As means for applying the dispersion solution, usually, there is preferably used a spraying method. This is because the dispersion solution is formed in the form of small liquid droplets on the surface of the formed body 1, and this method effectively suppresses the dispersion solution from separating into the liquid phases in short periods of time.

The dispersion solution used in the present invention is not an emulsion but is merely a dispersion solution that has not been emulsified. Therefore, the dispersion solution separates into phases with the passage of time. As will be described later, however, it has been confirmed that the dispersion solution is very highly stable, does not completely separate into phases in about 24 hours, and especially does not almost separate into phases in about 18 hours.

The liquid film 3 is, usually, formed on the surface of the formed body 1 in such a thickness that the amount of the liquid is about 1.48 to about 3.70 mg/cm$^2$. If the amount of the liquid is less than 1.48 mg/cm$^2$, the slipping property greatly decreases with the passage of time. If the amount of the liquid is more than 3.7 mg/cm$^2$, on the other hand, the slipping property is exhibited, but the liquid film which is present in an amount more than necessary is no longer sustained on the surface of the formed body 1 and flows away.

The structure 10 of the present invention having the surface structure as described above exhibits excellent slipping property to the emulsified products and excellently sustains the slipping property. Therefore, the structure 10 can be effectively applied to the use where the emulsified products flow in contact with the liquid film 3, and is best suited for use as a container for containing the emulsified products, i.e., for use where the formed body 1 is used in the form of a container from the standpoint of enjoying the advantage of the present invention to a maximum of degree.

There is no specific limitation on the shape of the container. Namely, the container may assume the form depending on the material forming the container, such as cup or cup-like container, bottle, bag (pouch), syringe, pot, tray, etc., and may also have been stretched.

Specifically, in the case of a synthetic resin container, a preform having the above-mentioned surface (inner surface that contacts to the content) is formed by a method known per se., is subjected to the after-treatments such as sticking a film thereto by heat-sealing and vacuum forming such as plug assist forming or blow-forming to prepare the formed body 1 having the shape of a container. The formed body 1 is then sprayed with the dispersion solution obtained by dispersing water in the edible oil to thereby form a desired liquid film 3 on the inner surface of the container.

Figure 3:
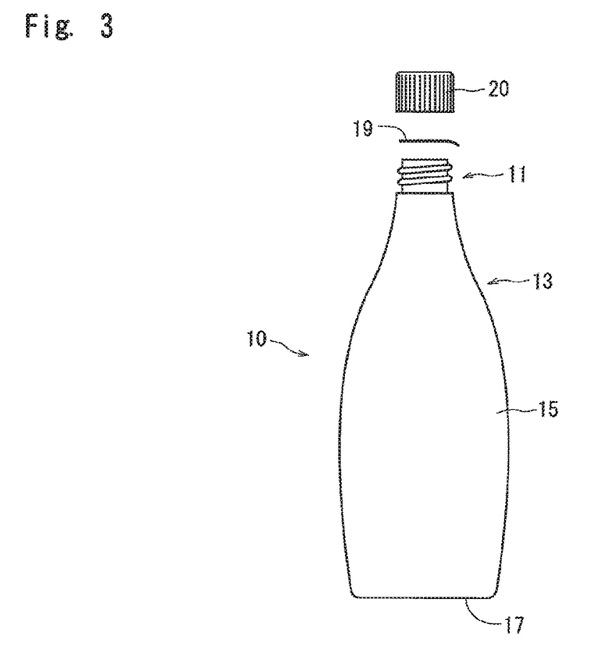
FIG. 3 It is a view illustrating the state of a directly blow-formed bottle which is a preferred embodiment of the structure of the present invention.

FIG. 3 shows a directly blow-formed bottle which is the most preferred embodiment of the structure 10 of the present invention.

In FIG. 3, the structure generally designated at 10 is used as a bottle, and includes a neck portion 1 having a screw thread, a body wall 15 continuous to the neck portion 11 via a shoulder portion 13, and a bottom wall 17 that is closing the lower end of the body wall 15. The above-mentioned liquid film 3 is formed on the inner surface of the bottle.

The above-mentioned structure 10 of the present invention exhibits excellent sliding property to the emulsified product. The emulsified product may be an oil-in-water type (O/W type) emulsified product in which oil droplets are dispersed in water or a water-in-oil type (W/O type) emulsified product in which water droplets are dispersed in the oil, i.e., a variety of kinds of emulsified products ranging from highly lipidic foods called mayonnaise to lowly lipidic mayonnaise foods.

According to experiments conducted by the present inventors, the slipping property is improved less for the emulsified products that contain less oils and, besides, the slipping property greatly decreases for such products with the passage of time. The present invention, however, makes it possible to exhibit excellent slipping property even for such emulsified products and to excellently sustain the slipping property. Therefore, it is most desired to apply the present invention to the lowly lipidic emulsified products.

For example, the present invention can be most desirably applied to the containers for containing mayonnaise-like foods having a lipid content of not more than 50%, for containing creamy dressings for salads as well as any other semi-solid dressings and, particularly, for containing highly viscous paste-like emulsified products having viscosities (23° C.) of not less than 500 mPa·s.

EXAMPLES

The invention will now be described by way of the following Experimental Examples.

Described below are the container, the dispersion solution and the content used in Examples and in Comparative Examples.

<Container>

There was provided a directly blow-formed multi-layer bottle having a multilayer structure of the following layer constitution and having a capacity of 400 g.

Inner layer: low-density polyethylene resin (LDPE)
Intermediate layer: ethylene-vinyl alcohol copolymer (EVOH)
Outer layer: low-density polyethylene resin (LDPE)
Adhesive layers (among the inner layer, intermediate layer and outer layer): acid-modified polyolefin <Dispersion Solution>

Edible oil: Salad oil to which medium-chain fatty acid is added (viscosity: 33 mPa·s (25° C.), angle of contact: 18 degrees).
Water: Pure water Dispersion solutions were prepared by finely dispersing the edible oil and water in amounts shown in Table 1 by using a homogenizer at 25° C., and were evenly applied in a predetermined amount onto the inner surfaces of the containers by using an air spray device.

<Measurements>

Angle of Contact;

The inner surface of the container was left to face upward, and 10 mg of an edible oil used for the dispersion solution was dropped thereon. The angle of contact thereof was measured by using an instrument for measuring contact angles (DropMaster 700 manufactured by Kyowa Interface Science Co., Ltd.) at 20° C., 50% RH.

Viscosity;

A liquid was introduced into a beaker, and a spindle and a guard of a B-type digital viscometer were put into the liquid. While maintaining the temperature at 25° C., the spindle was turned at 10 rpm per minute for one minute to measure the viscosity of the edible oil.

<Content>

An egg (50 g), 15 cc of vinegar and 2.5 cc of salt were mixed together and to which 150 cc of edible oil was, further, added to prepare a mayonnaise-like food for experiment. In Examples and Comparative Examples, the contents were prepared in required amounts and were used.

By using the contents of Examples and Comparative Examples, further, the slipping properties were evaluated in a manner as described below.

<Evaluating the Slipping Properties>

A spray nozzle was inserted in the bottle up to the bottom thereof and was pulled up while spraying the dispersion solution so that the dispersion solution was applied to the whole side wall surfaces starting from the bottom portion of the bottle. Into the bottle having the dispersion solution formed on the inner surface thereof, 400 g of the content or the mayonnaise-like food was introduced in a customary manner. The mouth portion of the bottle was heat-sealed with an aluminum foil and was sealed with a cap to obtain a filled bottle.

The bottle filled with the content was stored at 23° C. for one week (initial bottle).

The initial bottle was further stored for periods of time and at temperatures shown in Table 1. The thus stored bottle was pressed on its body portion, and the content was squeezed out up to its last drip through the mouth portion of the bottle. Thereafter, the air was introduced into the bottle to restore its original shape.

Next, the bottle was inverted (mouth portion down) and was stored for one hour. Thereafter, the body wall of the bottle was measured in regard to what extent the content has slid down (to what extent the content has no longer been adhered to the body wall portion). The content adhesion ratio was calculated in compliance with the following formula.

Content adhesion ratio (%)=(surface area on which the content is adhering/surface area of the body wall of the bottle)×100

From the content adhesion ratios calculated above, the slipping properties were evaluated on the following basis.
○: The content adhesion ratio is less than 10%.
Δ: The content adhesion ratio is not less than 10% but is less than 50%.
X: The content adhesion ratio is not less than 50%.

Examples 1 to 7

The dispersion solutions obtained by dispersing water in the edible oil were applied onto the formed bottles at water dispersion ratios and in amounts as shown in Table 1 to evaluate their slipping properties.

Comparative Example 1

The edible oil used for the dispersion solution was applied onto the formed bottle in an amount as shown in Table 1 to measure its slipping property.

Comparative Example 2

A liquid was prepared by mixing 3 g of Japan wax as an emulsifier and 70 g of water into 100 g of the edible oil. The mixture was emulsified at 80° C. and was cooled down to room temperature (25° C.). The liquid was applied to the formed battle in an amount shown in Table 1 to evaluate its slipping property.

TABLE 1

| | Dispersion solution | | | Slipping property | | |
|---|---|---|---|---|---|---|
| | Edible oil (g) | Water (g) | Amount applied (mg/cm$^2$) | Initial bottle | Bottle after stored at 40° C. for 2 weeks | Bottle after stored at 40° C. for 2 months |
| Example 1 | 50 | 50 | 1.97 | ○ | ○ | ○ |
| Example 2 | 50 | 50 | 1.48 | ○ | ○ | ○ |
| Example 3 | ↑ | ↑ | 3.70 | ○ | ○ | ○ |
| Example 4 | 70 | 30 | 1.97 | ○ | ○ | ○ |
| Example 5 | 90 | 10 | ↑ | ○ | Δ | Δ |
| Example 6 | 20 | 80 | ↑ | ○ | ○ | ○ |
| Example 7 | 10 | 90 | ↑ | ○ | ○ | Δ |
| Comp. Ex. 1 | 100 | — | 1.97 | ○ | X | X |
| Comp. Ex. 2 | 57 | 40 with emulsifier | ↑ | ○ | X | X |

The experimental results shown in Table 1 tell that upon forming the dispersion solution in which water is dispersed on the inner surface of the bottle, improved slipping property is exhibited to the content and, besides, the slipping property is sustained even after the bottle is stored at high temperatures for extended periods of time. It is, therefore, learned that the formed body is obtained by forming a liquid film on the inner surface thereof by using the dispersion solution obtained by dispersing water in the edible oil, and this formed body exhibits excellent slipping property to the content and sustains the slipping property over extended periods of time.

The dispersion solution was also examined for its stability.

Figure 4:
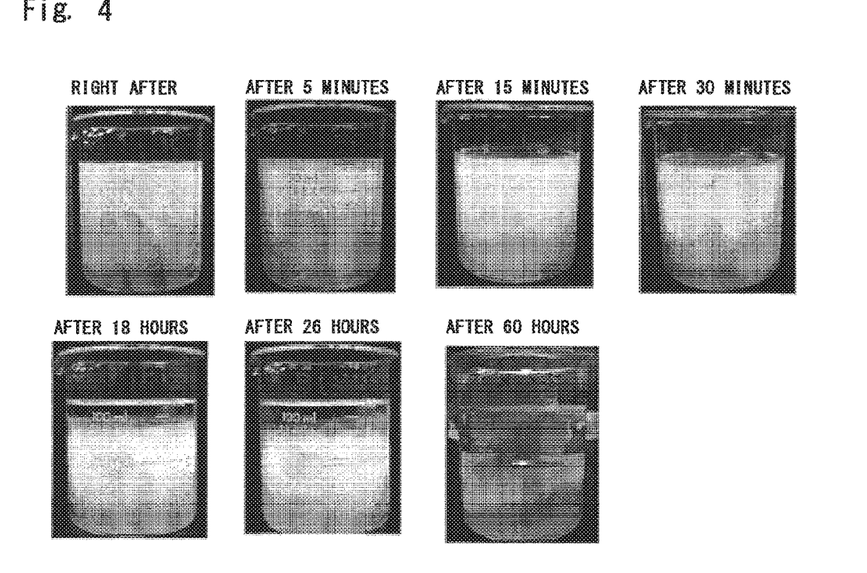
FIG. 4 It is a photograph showing the states of a dispersion solution with the passage of time, the dispersion solution being obtained by dispersing an edible oil in water.

Namely, 100 ml of the dispersion solution used in Example 1 was put into a beaker, and the degree of separation with the passage of time was confirmed with the eye. Photographs in FIG. 4 show the states of the dispersion solution with the passage of time while Table 2 shows the ratios of the edible oil and water (dispersion medium) separated with the passage of time.

TABLE 2

| | Passage of time | | | | | | |
|---|---|---|---|---|---|---|---|
| | Right after | After 5 minutes | After 15 minutes | After 30 minutes | After 18 hours | After 26 hours | After 60 hours |
| Edible oil | Dispersed (cloudy) | Dispersed (cloudy) | Dispersed (cloudy) | Dispersed (cloudy) | 10 ml | 15 ml | 50 ml |
| Water | | | | | 90 ml | 85 ml | 50 ml |

As shown in Table 2, it was confirmed only after 18 hours have passed from its preparation that the edible oil has partly separated. Even after its partial separation was confirmed, it could be confirmed with the eye that the edible oil had been finely dispersed in water. That is, the dispersion solution is applied in only a very small amount to the container which is the formed body, and its specific gravity is not almost affected; i.e., the edible oil separates away toward the side of the formed body and water separates away toward the side of the content. In the thus separated phases, the edible oil and water are still finely dispersed in stable states, respectively.

DESCRIPTION OF REFERENCE NUMERALS

1: formed body
3: liquid film
10: structure
11: neck portion
13: shoulder portion
15: body wall
17: bottom wall

The invention claimed is:
1. A method of producing a structure that includes a container and a liquid film formed on a surface thereof, the method comprising steps of:
   preparing a dispersion solution by dispersing, in a dispersion medium, a liquid that is incompatible therewith; and
   forming the liquid film of said dispersion solution by applying said dispersion solution onto the surface of said formed body before said dispersion medium and the liquid incompatible therewith separate away into liquid phases.
2. The method of production according to claim 1, wherein the container is filled with a content after the step of forming said liquid film but before the dispersion medium and the liquid incompatible therewith in said liquid film separate away into liquid phases.
3. A structure that includes a container, a liquid film formed on the inner surface of the container, and a content contained therein so as to come in contact with said liquid film,
   wherein said content is an emulsified product; and
   said liquid film comprises a dispersion solution obtained by suspending and dispersing water in an oily liquid that is insoluble in water.

4. The structure according to claim 3, wherein said liquid film comprises a first liquid film formed on the inner surface of said container and a second liquid film formed on said first liquid film, said first liquid film having a W/O dispersion structure that is rich in oil and contains little water, and said second liquid film having a dispersion structure that is richer in water than said first liquid film.

5. The structure according to claim 3, wherein said oily liquid that is insoluble in water is an edible oil.

* * * * *